United States Patent
Kitagawa et al.

(10) Patent No.: US 11,597,410 B2
(45) Date of Patent: Mar. 7, 2023

(54) AUTOMATIC DRIVING PROPOSAL DEVICE AND AUTOMATIC DRIVING PROPOSAL METHOD

(71) Applicant: DENSO CORPORATION, Kariya (JP)

(72) Inventors: Nozomi Kitagawa, Kariya (JP); Sei Iguchi, Kariya (JP); Norio Yamamoto, Kariya (JP); Kiyotaka Taguchi, Kariya (JP); Yuji Ota, Kariya (JP); Kazuyoshi Isaji, Kariya (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 16/817,294

(22) Filed: Mar. 12, 2020

(65) Prior Publication Data

US 2020/0207373 A1 Jul. 2, 2020

Related U.S. Application Data

(63) Continuation of application No. PCT/JP2018/037943, filed on Oct. 11, 2018.

(30) Foreign Application Priority Data

Oct. 13, 2017 (JP) .............................. 2017-199382

(51) Int. Cl.
*B60W 60/00* (2020.01)
*B60W 50/10* (2012.01)
(Continued)

(52) U.S. Cl.
CPC ........ *B60W 60/0059* (2020.02); *B60W 50/10* (2013.01); *B60W 60/0051* (2020.02);
(Continued)

(58) Field of Classification Search
CPC ......... B60W 60/0059; B60W 60/0057; B60W 2050/007; B60W 60/0051; B60W 60/0053; G05D 1/0061
See application file for complete search history.

(56) References Cited

U.S. PATENT DOCUMENTS

2014/0156133 A1 6/2014 Cullinane et al.

FOREIGN PATENT DOCUMENTS

| JP | 2011118603 A | 6/2011 |
| JP | 2015141051 A | 8/2015 |

(Continued)

OTHER PUBLICATIONS

U.S. Appl. No. 16/817,134, filed Mar. 12, 2020, Kitagawa et al.

*Primary Examiner* — Alan D Hutchinson
*Assistant Examiner* — Andy Schneider
(74) *Attorney, Agent, or Firm* — Harness, Dickey & Pierce, P.L.C.

(57) ABSTRACT

An automatic driving proposal device or an automatic driving proposal method is used for a vehicle that selects either a state of an automatic driving or a state of a manual driving by an occupant. The automatic driving proposal device or the automatic driving proposal method performs a driving change request to the occupant in the state of the automatic driving, determines whether the automatic driving is possible in the state of the manual driving, calculates a calculation value corresponding to a distance or a prediction time or calculates a change index, and proposes the automatic driving to the occupant on a necessary condition of determining that the automatic driving is possible and also determining that the calculation value is higher than a threshold value or determining that the change index is lower than a threshold value.

6 Claims, 6 Drawing Sheets

(51) Int. Cl.
   *G05D 1/00*        (2006.01)
   *B60W 50/00*     (2006.01)
(52) U.S. Cl.
   CPC ....... *B60W 60/0057* (2020.02); *G05D 1/0061* (2013.01); *B60W 2050/007* (2013.01)

(56) References Cited

FOREIGN PATENT DOCUMENTS

| | | |
|---|---|---|
| JP | 2016207064 A | 12/2016 |
| JP | 2016212905 A | 12/2016 |
| WO | WO-2015/162764 A1 | 10/2015 |
| WO | WO-2019/074066 A1 | 4/2019 |

AUTOMATIC DRIVING PROPOSAL DEVICE AND AUTOMATIC DRIVING PROPOSAL METHOD

CROSS REFERENCE TO RELATED APPLICATION

The present application is a continuation application of International Patent Application No. PCT/JP2018/037943 filed on Oct. 11, 2018, which designated the U.S. and claims the benefit of priority from Japanese Patent Application No. 2017-199382 filed on Oct. 13, 2017. The entire disclosures of all of the above applications are incorporated herein by reference.

TECHNICAL FIELD

The present disclosure relates to an automatic driving proposal device and an automatic driving proposal method.

BACKGROUND

Currently, vehicles having a limited automatic driving function of maintaining a vehicle lane on a highway are commercialized. In the future, the automatic driving function may be used not only on the highway but also on an ordinary road. A technology related to the automatic driving on the ordinary road has been proposed.

SUMMARY

An automatic driving proposal device or an automatic driving proposal method is used for a vehicle that selects either a state of automatic driving or a state of manual driving by an occupant. The automatic driving proposal device or the automatic driving proposal method performs a driving change request to the occupant in the state of automatic driving, determines whether automatic driving is possible in the state of manual driving, calculates a calculation value corresponding to a distance or a prediction time or calculates a change index, and proposes automatic driving to the occupant on a necessary condition of determining that automatic driving is possible and also determining that the calculation value is higher than a threshold value or determining that the change index is lower than a threshold value.

DETAILED DESCRIPTION

Figure 1:
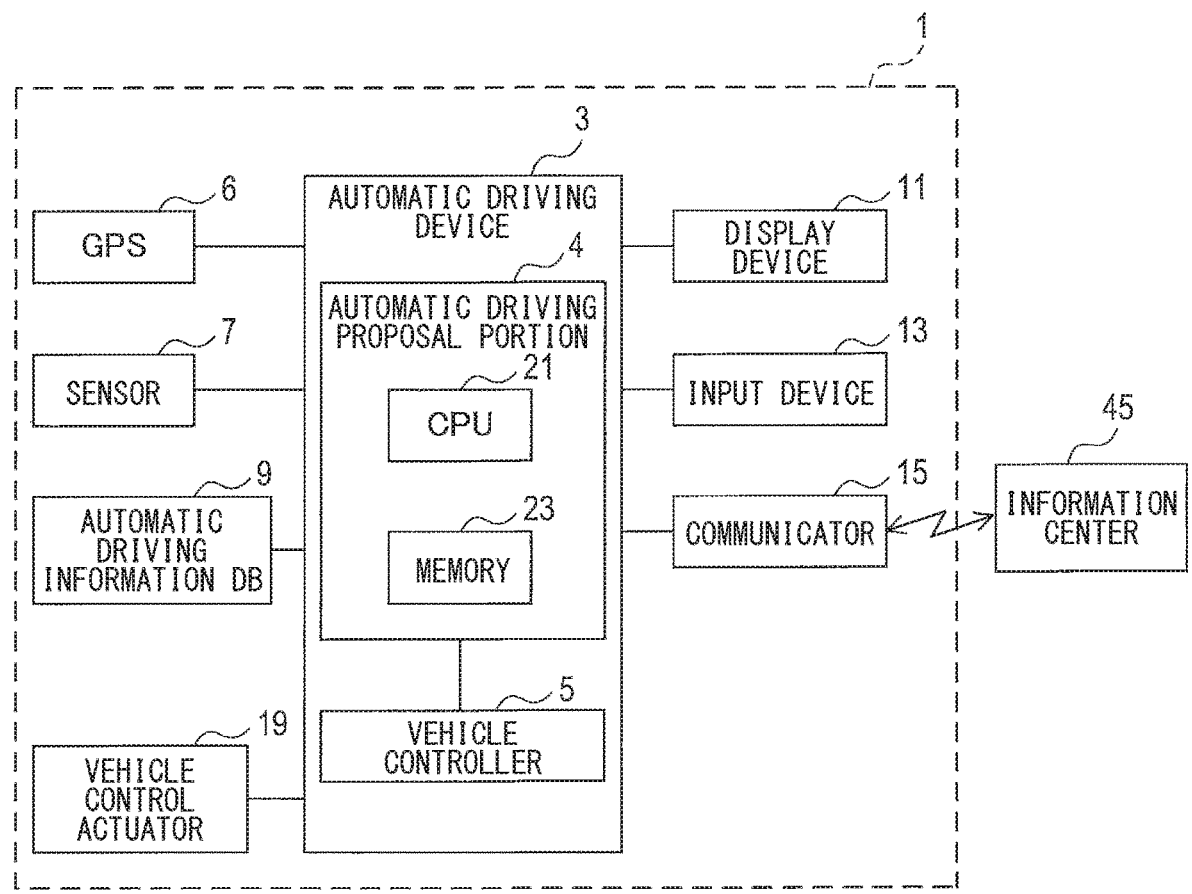
FIG. 1 is a block diagram showing configurations of an in-vehicle system and an automatic driving system.

An automatic driving system proposes automatic driving to a driver when determining that automatic driving can be performed in a state of manual driving. The driver is able to select automatic driving in accordance with the proposal of automatic driving.

A traffic environment of an ordinary road is very complex. Therefore, on the ordinary road, a sensing capability or a process capability of an automatic driving system may cause automatic driving to be difficult. The automatic driving system performs a driving change request to a driver when determining that it is difficult to continue the automatic driving. When the vehicle arrives at a preset change point, the automatic driving system performs the driving change request to the driver.

As a result of detailed studies by the inventors, the following difficulties have been found. Immediately after the driver selects the automatic driving in accordance with the automatic driving proposal, the automatic driving system may perform the driving change request. As the result, the driver could distrust the automatic driving system, and may not use the automatic driving function. One example of the present disclosure provides an automatic driving proposal device and an automatic driving proposal method capable of preventing a driving change request from being performed immediately after a driver selects automatic driving in accordance with an automatic driving proposal.

According to one example embodiment, an automatic driving proposal device is used for a vehicle configured to select either a state of automatic driving or a state of manual driving by an occupant. The automatic driving proposal device may include: a request unit that performs a driving change request to the occupant when, in the state of automatic driving, the vehicle has arrived at a change point set in advance on a route of the automatic driving; an automatic driving determination unit that determines whether automatic driving is possible in the state of manual driving; a calculation unit that calculates a calculation value corresponding to a distance from a current position of the vehicle to the change point or a prediction time until the vehicle arrives at the change point; a calculation value determination unit that determines whether the calculation value is higher than a threshold value set in advance; and a proposal unit that proposed automatic driving to the occupant on a necessary condition that the automatic driving determination unit determines that the automatic driving is possible and also the calculation value determination unit determines that the calculation value is higher than the threshold value.

According to one example embodiment, even in a case when automatic driving can be performed, the automatic driving proposal device does not propose automatic driving when the calculation value is equal to or less than the threshold value. According to this, it may be possible to prevent a situation where the vehicle immediately arrives at the change point and the driving change request is performed immediately after the occupant of the vehicle selects automatic driving in accordance with the automatic driving proposal. As the result, it is possible to prevent the occupant of the vehicle from distrusting the automatic driving system.

According to another example embodiment, an automatic driving proposal device is used for a vehicle that selects either a state of automatic driving or a state of manual driving by an occupant. The automatic driving proposal device includes: a continuation determination unit that determines whether continuation of automatic driving is possible; a request unit that performs a driving change request when the continuation determination unit determines that the continuation of the automatic driving is not possible; an automatic driving determination unit that determines whether automatic driving is possible in the state of manual driving; an index calculation unit that calculates a change index that indicates a probability that the request unit performs the driving change request by a time when the vehicle in the state of automatic driving arrives at a point positioned in front of a current position by a predetermined distance; an index determination unit that determines whether the change index is lower than a threshold value set in advance; and a proposal unit that proposes automatic driving to the occupant on a necessary condition that the automatic driving determination unit determines that automatic driving is possible and also the index determination unit determines that the change index is lower than the threshold value.

According to another example embodiment, the automatic driving proposal device does not propose automatic driving when the change index is equal to or higher than the threshold value. According to this, it is possible to prevent a situation where the continuation of the automatic driving is determined to be difficult and the driving change request is performed immediately after the occupant of the vehicle selects the automatic driving in accordance with the automatic driving proposal. As the result, it is possible to prevent the occupant of the vehicle from distrusting the automatic driving system.

Furthermore, according to another example embodiment, an automatic driving proposal method is used for a vehicle that selects either a state of automatic driving or a state of manual driving by an occupant. The automatic driving proposal method includes: performing a driving change request to the occupant when, in the state of automatic driving, the vehicle has arrived at a change point set in advance on a route of the automatic driving; determining whether the automatic driving is possible in the state of manual driving; calculating a calculation value corresponding to a distance from a current position of the vehicle to the change point or a prediction time until the vehicle arrives at the change point; determining whether the calculation value is higher than a threshold value set in advance; and proposing automatic driving to the occupant on a necessary condition of determining that the automatic driving is possible and also determining that the calculation value is higher than the threshold value.

According to another example embodiment, even in a case of determining that automatic driving can be performed, the automatic driving proposal method does not propose automatic driving when the calculation value is equal to or less than the threshold value. According to this, it may be possible to prevent a situation where the vehicle immediately arrives at the change point and the driving change request is performed immediately after the occupant of the vehicle selects the automatic driving in accordance with the automatic driving proposal. As the result, it may be possible to prevent the occupant of the vehicle from distrusting the automatic driving system.

Furthermore, according to another example embodiment, an automatic driving proposal method is used for a vehicle configured to select either a state of automatic driving or a state of manual driving by an occupant. The automatic driving proposal method includes: determining whether continuation of automatic driving is possible in the state of automatic driving; performing a driving change request when determining that continuation of automatic driving is not possible; determining whether automatic driving is possible in the state of manual driving; calculating a change index that indicates a probability that the driving change request can be performed by a time when the vehicle in the state of the automatic driving arrives at a point positioned in front of a current position by a predetermined distance; determining whether the change index is lower than a threshold value set in advance; and proposing automatic driving to the occupant on a necessary condition of determining that automatic driving is possible and also determining that the change index is lower than the threshold value.

According to another example embodiment, the automatic driving proposal method does not propose automatic driving when the change index is equal to or the threshold value. According to this, it is possible to prevent a situation where the continuation of automatic driving is determined to be difficult and the driving change request is performed immediately after the occupant of the vehicle selects automatic driving in accordance with the automatic driving proposal. As the result, it is possible to prevent the occupant of the vehicle from distrusting the automatic driving system.

Hereinafter, embodiments of the present disclosure will be described with reference to the drawings.

First Embodiment

1. Configurations of In-Vehicle System and Automatic Driving Apparatus

Configurations of an in-vehicle system 1 and an automatic driving apparatus 3 will be described with reference to FIG. 1 and FIG. 2. The in-vehicle system 1 and the automatic driving apparatus 3 are mounted on a vehicle. Hereinafter, the vehicle on which the in-vehicle system 1 and the automatic driving apparatus 3 are mounted may be also referred to as a mounted vehicle. The automatic driving apparatus 3 may correspond to an automatic driving system.

As shown in FIG. 1, the in-vehicle system 1 includes an automatic driving apparatus 3, a GPS 6, a sensor 7, automatic driving information DB 9, a display device 11, an input device 13, a communicator 15, and a vehicle control actuator 19.

The automatic driving apparatus 3 includes an automatic driving proposal portion 4 and a vehicle controller 5. The automatic driving proposal portion 4 includes a microcomputer having a CPU 21 and a semiconductor memory (hereinafter, a memory 23) such as a RAM or a ROM, for example. Each function of the automatic driving proposal portion 4 may be implemented by the CPU 21 executing a program stored in a non-transitory tangible storage medium. In this example, the memory 23 corresponds to the non-transitory tangible storage medium storing the program. By executing this program, a method in accordance with the program is performed. The automatic driving proposal portion 4 may include one microcomputer or multiple microcomputers.

Figure 2:
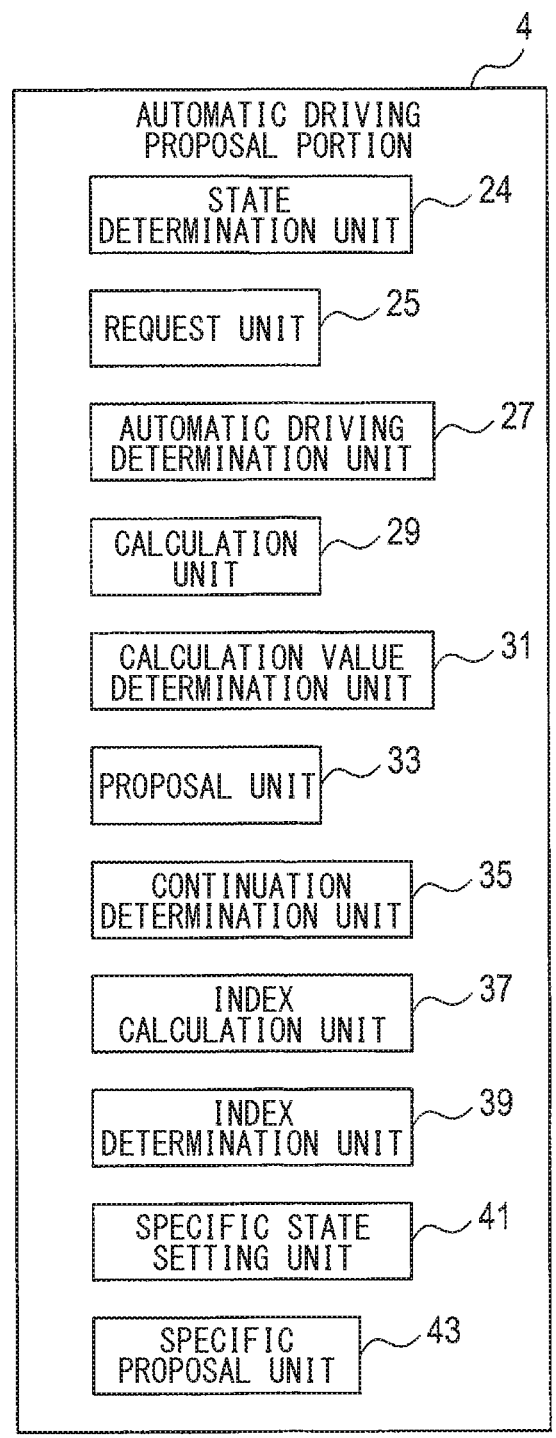
FIG. 2 is a block diagram showing a functional configuration of an automatic driving proposal portion.
Figure 3:
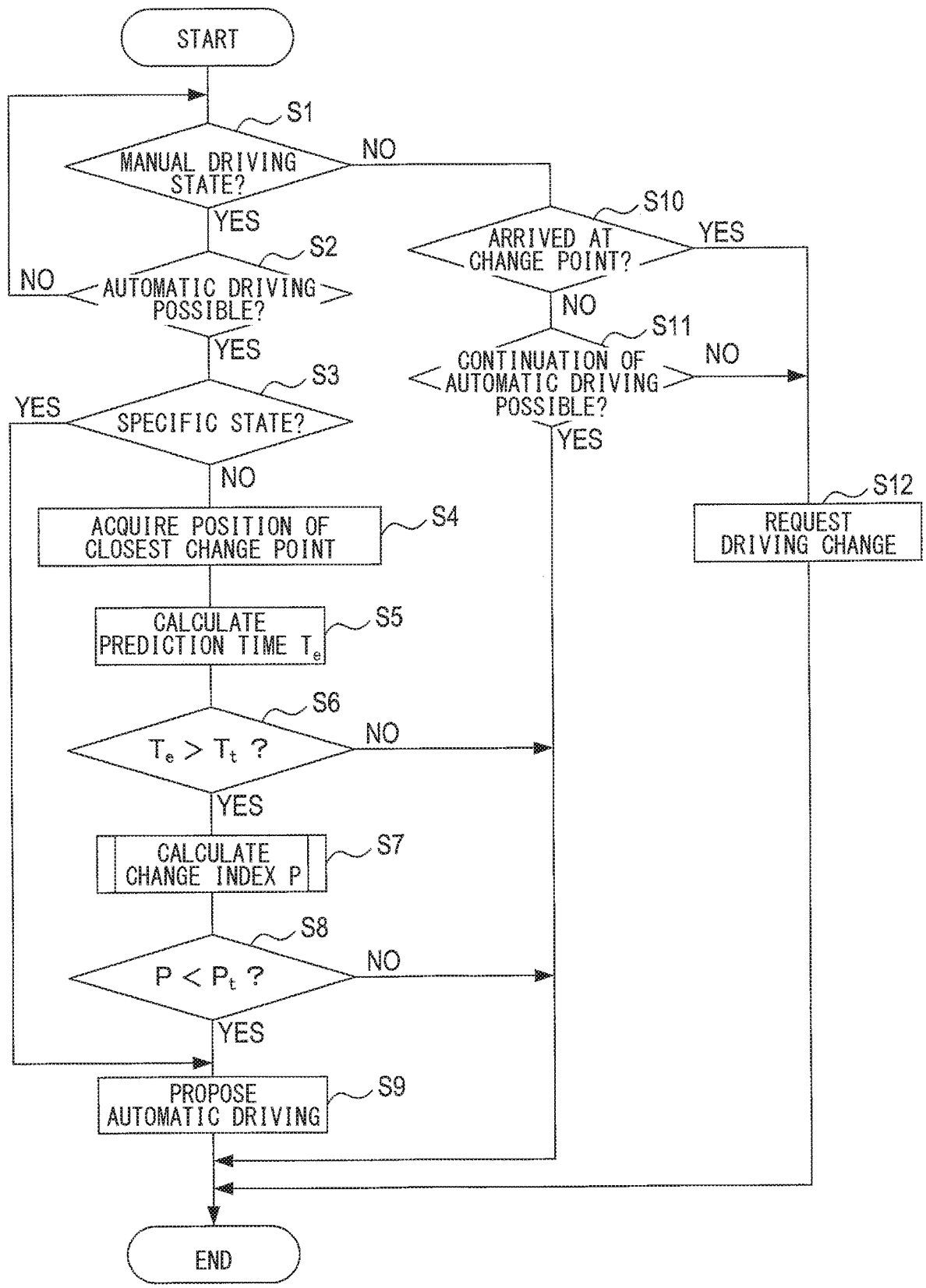
FIG. 3 is a flowchart showing an entire process executed by the automatic driving proposal portion.

As shown in FIG. 2, the automatic driving proposal portion 4 includes a state determination unit 24, a request unit 25, an automatic driving determination unit 27, a calculation unit 29, a calculation value determination unit 31, a proposal unit 33, a continuation determination unit 35, an index calculation unit 37, an index determination unit 39, a specific state setting unit 41, and a specific proposal unit 43.

The method of implementing each function of the automatic driving proposal portion 4 is not limited to software, and a part or all of its functions may be implemented by using one or multiple hardware. For example, when the above-described function may be implemented by an electronic circuit which is hardware, the electronic circuit may be implemented by a digital circuit, an analog circuit, or a combination thereof. The automatic driving proposal portion 4 may correspond to an automatic driving device.

The vehicle controller 5 performs the automatic driving along a route set in advance. The vehicle controller 5 controls the vehicle control actuator 19 based on a recognition result of the sensor 7 or the like, and performs the automatic driving.

The GPS 6 acquires position information of the mounted vehicle. The sensor 7 recognizes an environment around the mounted vehicle. The automatic driving information DB 9 stores a table (hereinafter, also referred to as a distance coefficient table) that defines a relation between a factor and a distance coefficient K.

The factor affects a probability (hereinafter, also referred to as a change request probability) that the request unit 25 performs the driving change request to the driver during the automatic driving. The driving change request corresponds to a request for requesting the driver to shift to a manual driving state when the mounted vehicle is in an automatic driving state. An aspect of the driving change request includes, for example, display of an image on the display device 11, output of a sound, or the like.

The factor includes, for example, a date and time factor, a weather factor, a road structure factor, or the like. The day and time factor includes, for example, time, day of the week, or the like. For example, when a traffic amount increases or decreases at a specific time or a specific day of the week, the time or the day of the week affects the recognition result of the sensor 7. As a result, the time or the day of the week affects the change request probability.

The weather factor includes, for example, a distinction between a sunny condition, a cloudy condition, and a rainy condition. Furthermore, the weather factor includes, for example, a rainfall amount. The weather factor affects the recognition result of the sensor 7. As the result, the weather factor affects the change request probability. The change request probability when the weather condition is cloudy is higher than that when the weather condition is sunny. The change request probability when the weather condition is rainy is higher than that when the weather condition is cloudy. Also, the greater the amount of rainfall is, the higher the change request probability is.

The road structure factor includes, for example, a distinction between a highway, an automobile road, a national highway, and an ordinary road. The road structure factor includes, for example, a distinction between a straight road and a winding road. The factor of the road structure includes, for example, a distinction between a road having one lane on each side, a road having two lanes on each side, a road having three or more lanes on each side.

The road structure factor includes, for example, the presence or the absence of a right turn only lane, the presence or the absence of a pedestrian walkway, or the like. The road structure factor includes, for example, the presence or the absence of an intersection, a numeral number of the intersection, the presence or the absence of a pedestrian crosswalk, a numeral number of the pedestrian crosswalk, the presence or the absence of a traffic signal, a numeral number of the traffic signal, or the like. The road structure factor affects the recognition result of the sensor 7 and a control complexity of the vehicle control actuator 19 when the automatic driving is performed. As the result, the road structure factor affects the change request probability.

In the distance coefficient table, as the factor increases the change request probability, the distance coefficient K associated with the factor increases. An example of a relation between the factor and the distance coefficient K in the distance coefficient table will be described below.

When the factor is "the sunny condition" and also "the automobile road", the distance coefficient K is 0.01.

When the factor is "a weak rain with the amount of rainfall of 2 mm/h" and also "the automobile road", the distance coefficient K is 0.02.

When the factor is "a strong rain with the amount of rainfall of 20 mm/h" and also "the automobile road", the distance coefficient K is 0.1. When the factor is "the sunny condition" and also "the national highway or the ordinary road", the distance coefficient K is 0.05.

When the factor is "the weak rain with the rainfall amount of 2 mm/h" and also "the national highway or the ordinary road", the distance coefficient K is 0.1. When the factor is "the strong rain with the rainfall amount of 20 mm/h" and also "the national highway or the ordinary road", the distance coefficient K is 0.5.

These values are shown in the following distance coefficient table (Table 1) as follows:

TABLE 1

| Factor | Distance coefficient K |
| --- | --- |
| Sunny Automobile road | 0.01 |
| Weak rain with rainfall amount of 2 mm/h Automobile road | 0.02 |
| Strong rain with rainfall amount of 20 mm/h Automobile road | 0.1 |
| Sunny National highway or ordinary road | 0.05 |
| Weak rain with rainfall amount of 2 mm/h National highway or ordinary road | 0.1 |
| Strong rain with rainfall amount of 20 mm/h National highway or ordinary road | 0.5 |

The automatic driving information DB 9 stores a table (hereinafter, also referred to as a behavior index table) that defines a relation between a behavior type, the factor, and a behavior index PB.

The behavior corresponds to a behavior performed by the mounted vehicle when traveling along the route candidate. The behavior type includes, for example, "a behavior of going straight at an intersection", "a behavior of turning right at the intersection", "a behavior of turning left at the intersection", "a behavior of changing a lane", "a behavior of entering an interchange", or the like. The behavior index table defines the behavior index PB in accordance with a combination of the behavior types and the factors. Thereby, when, in the behavior index table, the behavior type and the factor are identified, the behavior index PB is determined in accordance with the identified behavior type and the identified factor.

In the behavior index table, as the combination of the behavior type and the factor increases the change request probability, the behavior index PB associated with the combination increases. An example of a relation between the combination of the behavior type and the factor in the behavior index table and the behavior index PB will be described below.

When the behavior type is "the behavior of going straight at the intersection" and the factor is "the sunny weather", the behavior index PB is 0.001. When the behavior type is "the behavior of going straight at the intersection" and the factor is "the weak rain with the amount of rainfall of 2 mm/h", the behavior index PB is 0.002.

When the behavior type is "the behavior of going straight at the intersection" and the factor is "the strong rain with the amount of rainfall of 20 mm/h", the behavior index PB is 0.01. When the behavior type is "the behavior of turning right or left at the intersection" and the factor is "the sunny weather", the behavior index PB is 0.005.

When the behavior type is "the behavior of turning right or left at the intersection" and the factor is "the weak rain with the amount of rainfall of 2 mm/h", the behavior index PB is 0.01. When the behavior type is "the behavior of turning right or left at the intersection" and the factor is "the strong rain with the amount of rainfall of 20 mm/h", the behavior index PB is 0.05.

These values are shown in the following behavior index table (Table 2) as follows:

TABLE 2

| Factor | Behavior type | Behavior index PB |
|---|---|---|
| Sunny | Go straight at intersection | 0.001 |
| Weak rain with rainfall amount of 2 mm/h | Go straight at intersection | 0.002 |
| Strong rain with rainfall amount of 20 mm/h | Go straight at intersection | 0.01 |
| Sunny | Turn right or left at intersection | 0.005 |
| Weak rain with rainfall amount of 2 mm/h | Turn right or left at intersection | 0.01 |
| Strong rain with rainfall amount of 20 mm/h | Turn right or left at intersection | 0.05 |

The automatic driving information DB 9 stores map information. The map information includes, for example, a road profile, vehicle lane numeral number information, speed limitation information, intersection information, crossing walkway information, or the like. The automatic driving information DB 9 stores automatic driving capability road information, the change point, or the like. The mounted vehicle performs the driving change request when arriving at the change point in the automatic driving state. A position of the change point corresponds to a fixed position on the route of the automatic driving. The change point includes, for example, a point before the interchange, a point before a known location where the automatic driving is difficult to be performed due to construction work or an accident, or the like.

A part or all of the information stored in the automatic driving information DB 9 may be stored in an information center 45 described later.

The display device 11 corresponds to a display placed in a compartment of the mounted vehicle. The display device 11 is able to display an image. The input device 13 is placed in the compartment of the mounted vehicle. The input device 13 receives an operation by an occupant of the mounted vehicle. The occupant may correspond to the driver or an occupant other than the driver. The input device 13 includes, for example, a touch panel, a keyboard, various switches, a voice input device, or the like.

The communicator 15 wirelessly communicates with the information center 45. The information center 45 transmits traffic information, weather information, or the like to the communicator 15. The vehicle control actuator 19 controls a traveling state of the mounted vehicle in accordance with the instruction of the vehicle controller 5.

2. Basic Function of Automatic Driving Apparatus

The automatic driving apparatus 3 sets either the automatic driving state or the manual driving state in accordance with a selection of the occupant. In a case of the automatic driving state, the vehicle controller 5 performs the automatic driving along a preset route.

3. Process Executed by Automatic Driving Proposal Portion

A process executed by the automatic driving proposal portion 4 will be described with reference to FIGS. 3 to 6. In a S1 of FIG. 3, the state determination unit 24 determines whether the mounted vehicle is in the manual driving state. When the mounted vehicle is in the manual driving state, the process proceeds to a S2. When the mounted vehicle is in the automatic driving state, the process proceeds to a S10.

In the S2, the automatic driving determination unit 27 determines whether the automatic driving is possible. When the automatic driving is possible, the process proceeds to a S3. When the automatic driving is not possible, the process returns to the S1.

When all of the following conditions (i) to (iv) are satisfied, the automatic driving determination unit 27 determines that the automatic driving is possible. When at least one of the following conditions (i) to (iv) is not satisfied, the automatic driving determination unit 27 determines that the automatic driving is not possible.

(i) A route to the destination is identified.

(ii) An object position and a position of a white line or a traveling road are identifiable around the mounted vehicle.

(iii) When there is an obstacle in the route of the automatic driving, a route path for avoiding the obstacle can be calculated.

(iv) When the route path is calculated in the (iii), a lateral torque control of the mounted vehicle and a longitudinal torque control can be control in accordance with the calculated route path.

In order to identify the route of the (i), the destination, road link information or a map, and a current position of own vehicle are necessary. In order to satisfy the (ii), it is necessary for the automatic driving determination unit 27 to recognize a distance and an azimuth to the object around the vehicle, the position of the white line or the traveling road, a state of the traffic signal, a traffic sign, or the like. The traffic sign may correspond to in-map information.

In order to satisfy the (iii), it is necessary for the automatic driving determination unit 27 to recognize the state of the mounted vehicle, a position relation between the mounted vehicle, the road, and the obstacle, a relative motion of the mounted vehicle to the road and the obstacle, or the like. In order to satisfy the (iv), it is necessary for the automatic driving determination unit 27 to acquire speed information of the mounted vehicle, acceleration-deceleration speed information of the mounted vehicle, yaw rate information of the mounted vehicle, or the like.

For example, when the sensor 7 is difficult to recognize the position of the white line due to the strong rain, the (iii) is not satisfied. When the rain is weakened, the sensor 7 is possible to recognize the white line position. However, since it rains in various states, the automatic driving determination unit 27 may be preferable to determine whether the (ii) is satisfied after a certain time lapses from a time when the recognition of the white line becomes possible.

In the S3, the specific state setting unit 41 determines whether a state of the automatic driving proposal portion 4 is a specific state. When the occupant performs a predetermined operation on the input device 13, the state of the automatic driving proposal portion 4 becomes the specific state. When the state of the automatic driving proposal portion 4 is the specific state, the process proceeds to a S9. When the state of the automatic driving proposal portion 4 is not the specific state, the process proceeds to a S4. The specific state may correspond to a state where, merely, the automatic driving proposal is performed on only a condition that the automatic driving determination unit 27 determines that the automatic driving can be performed. The operation performed by the occupant may correspond to an operation of setting the specific state displayed on the display placed in the compartment of the vehicle. Specifically, the occupant is able to set whether to change the current state to the specific state by operating the switch or the touch panel placed in the display.

Figure 4:
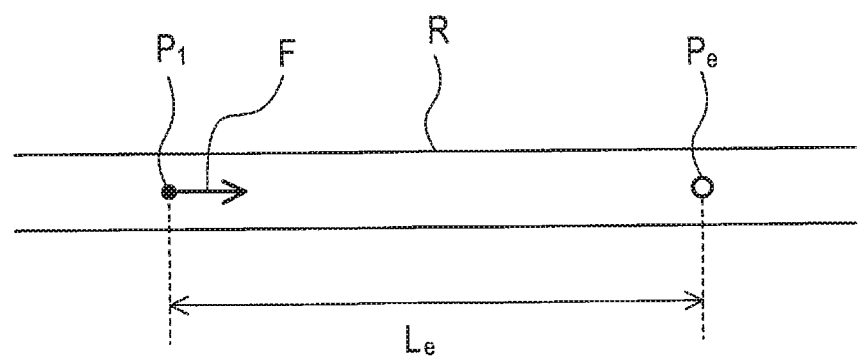
FIG. 4 is an explanatory view illustrating a calculation method of a distance $L_e$.
Figure 5:
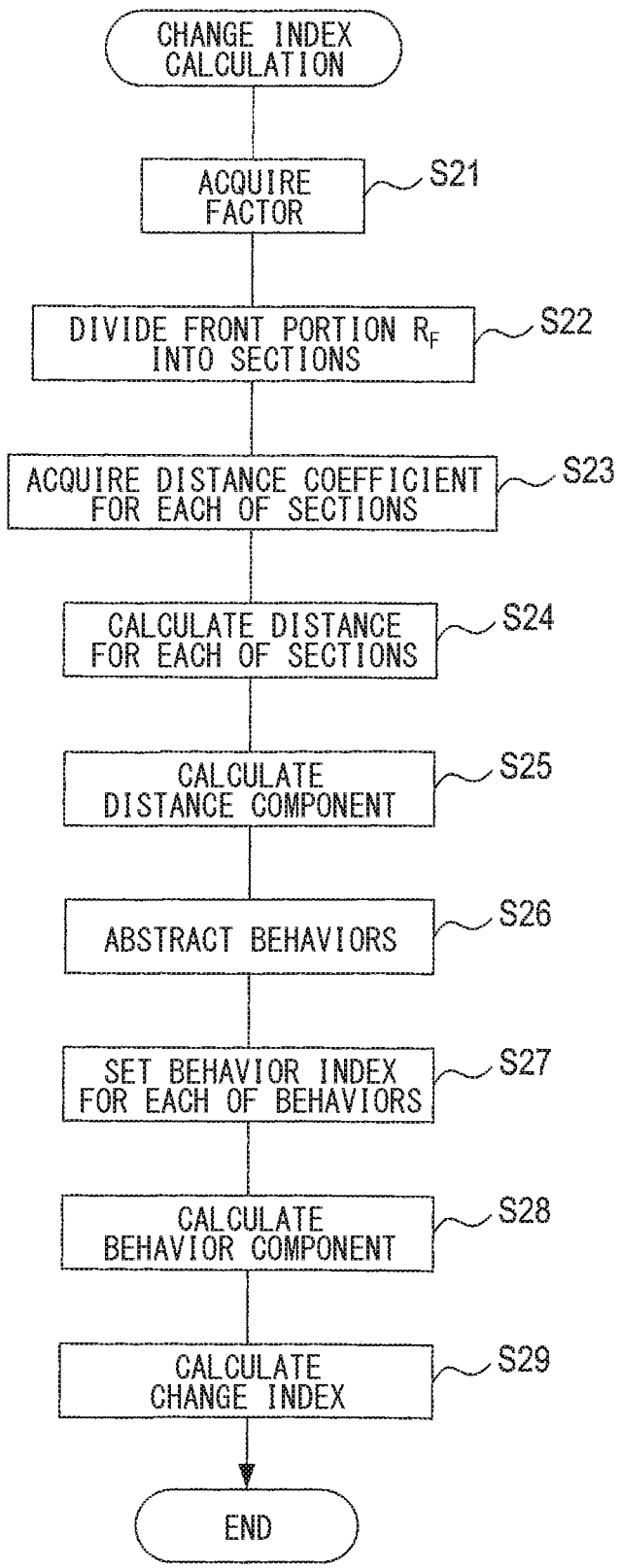
FIG. 5 is a flowchart showing a change index calculation process executed by the automatic driving proposal portion.

In the S4, the calculation unit 29 acquires the position of the closest change point. As shown in FIG. 4, a closest change point $P_e$ is on a route R in which the mounted vehicle performs the automatic driving. The closest change point $P_e$ corresponds to a change point that exists in a side of an advancing direction of the mounted vehicle when viewed from a current point $P_1$ of the mounted vehicle and is closest to the current point $P_1$ among the change points. The position of the change point is stored in the map information. The calculation unit 29 checks the current point $P_1$ acquired by using the GPS 6 by comparing with the preset route R, and thereby is able to acquire the position of the closest change point $P_e$.

In a S5, first, the calculation unit 29 calculates a distance $L_e$ from the current point $P_1$ to the closest change point $P_e$, as shown in FIG. 4. Next, the calculation unit 29 calculates a prediction time $T_e$ until the mounted vehicle arrives at the closest change point $P_e$ by dividing the distance $L_e$ by an estimation average speed $V_e$. The prediction time $T_e$ corresponds to a calculation value. The estimation average speed $V_e$ corresponds to an estimation average speed when the mounted vehicle travels from the current change point $P_1$ to the closest point $P_e$ by the automatic driving.

In a S6, the calculation value determination unit 31 determines whether the prediction time $T_e$ calculated in the S5 is higher than a threshold value $T_t$ set in advance. When the prediction time $T_e$ is higher than the threshold value $T_t$, the process proceeds to a S7. When the prediction time $T_e$ is equal to or less than the threshold value $T_t$, the process ends.

In the S7, the index calculation unit 37 calculates a change index P. A process of the S7 will be described in detail with reference to FIG. 5. In a S21 of FIG. 5, the index calculation unit 37 acquires a factor in a front portion (or forward portion) RE shown in FIG. 6. The front portion $R_F$ corresponds to a portion of the route R in which the current point $P_1$ is a start point and a point $P_2$ positioned in front of the current point $P_1$ by a predetermined distance is an end point. The predetermined distance is a fixed value. The acquired factor includes, for example, the data and time factor, the weather factor, the road structure factor, or the like. When the front portion $R_F$ differs depending on locations, the index calculation unit 37 acquires the factor in each of the locations.

The index calculation unit 37 is able to acquire, for example, the date and time factor from a clock (not shown). The index calculation unit 37 is able to acquire the weather information from the information center 45 by using the communicator 15, and acquire the weather factor from the weather information. The index calculation unit 37 is able to acquire the road structure factor from the map information stored in the automatic driving information DB 9.

Figure 6:
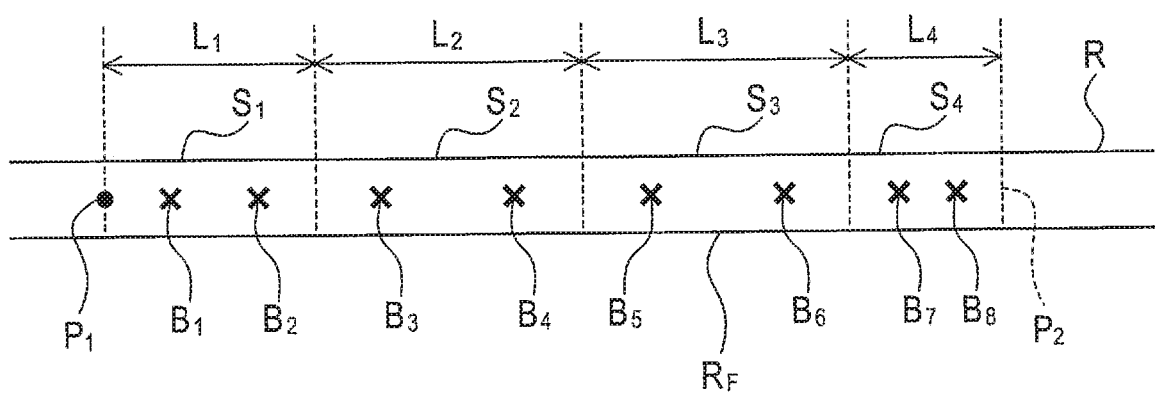
FIG. 6 is an explanatory view illustrating a method of calculating a change index.

In a S22, the index calculation unit 37 divides the front portion $R_F$ into at least one section in accordance with the factor. In each section, the factors are same. FIG. 6 shows an example in which the front portion $R_F$ is divided. In this example, the front portion $R_F$ is divided into sections $S_1$ to $S_4$. In the section $S_1$, all the factors are same. The similar applies to the sections $S_2$ to $S_4$.

In a S23, the index calculation unit 37 sets, for each of the sections obtained by the division in the S22, the distance coefficient K based on the factor in each of the sections. That is, the index calculation unit 37 checks the factor in the section by comparing with the distance coefficient table, and sets the distance coefficient K in the section. In the example of FIG. 6, the index calculation unit 37 checks the factor in the section $S_1$ by comparing with the distance coefficient table, and sets a distance coefficient $K_1$ in the section $S_1$. Similarly, the index calculation unit 37 sets distance coefficients $K_2$ to $K_4$ in the sections $S_2$ to $S_4$, respectively.

In a S24, the index calculation unit 37 calculates the distance of each section obtained by the division in the S22. In the example shown in FIG. 6, the index calculation unit 37 calculates a distance $L_1$ of the section $S_1$, a distance $L_2$ of the section $S_2$, a distance $L_3$ of the section S3, and a distance $L_4$ of the section $S_4$.

In a S25, the index calculation unit 37 calculates a distance component $P_L$ among change indexes P, based on an equation (1).

$$P_L = \Sigma_{i=1}^{m} K_i L_i \quad \text{Equation (1)}$$

The distance component $P_L$ corresponds to a value obtained by integrating values obtained by multiplying the section distance Li by the distance coefficient Ki for all the sections. The distance $L_i$ corresponds to a distance of the section $S_i$. The distance coefficient $K_i$ corresponds to a coefficient in the section $S_i$. The i corresponds to a natural number of 1 or more. The m corresponds to a numeral number of the section in the front portion $R_F$.

In a S26, the index calculation unit 37 extracts a behavior B in the front portion $R_F$. The extracted behavior B corresponds to a behavior associated with the behavior index PB in the behavior index table. In the example shown in FIG. 6, the index calculation unit 37 extracts behaviors $B_1$ to $B_8$.

In a S27, the index calculation unit 37 identifies the factor at the location of the behavior B for each behavior B extracted in the S26. In the example shown in FIG. 6, the index calculation unit 37 identifies the factor at the location of the behavior $B_1$. Similarly, the index calculation unit 37 identifies the factors at the locations of the behaviors $B_2$ to $B_8$.

Next, the index calculation unit 37 sets the behavior index PB based on the behavior type and the factor at the location of the behavior for each behavior B extracted in the S26. That is, the index calculation unit 37 checks the combination of the type of the behavior B and the factor at the location of the behavior B by comparing with the behavior index table, and thereby sets the behavior index PB of the behavior B.

In the example shown in FIG. 6, the index calculation unit 37 checks the combination of the type of the behavior $B_1$ and the factor at the location of the behavior $B_1$ by comparing with the behavior index table, and thereby sets the behavior index PB of the behavior $B_1$. Similarly, the index calculation unit 37 sets the behavior indexes $PB_2$ to $PB_8$ for the behaviors $B_2$ to $B_8$, respectively.

In a S28, the index calculation unit 37 calculates a behavior component PB among the change indexes P, based on an equation (2).

$$P_B = \Sigma_{j=1}^{n} PB_j \quad \text{Equation (2)}$$

The behavior component PB corresponds to a value obtained by integrating, for each behavior, the behavior index $PB_j$ set in the S27. The behavior index $PB_j$ corresponds to a behavior index of the behavior $B_j$. The j corresponds to a natural number from 1 to n. The m corresponds to a numeral number of the behavior B in the front portion $R_F$. In the example shown in FIG. 6, a value obtained by integrating the behavior indexes $PB_2$ to $PB_8$ corresponds to the behavior component $P_B$.

In a S29, the index calculation unit 37 calculates the change index P by adding the distance component $P_L$ calculated in the S25 to the behavior component $P_B$ calculated in the S28 as shown in an equation (3).

$$P = P_L + P_B \quad \text{Equation (2)}$$

Returning to FIG. 3, in a S8, the index determination unit 39 determines whether the change index P calculated in the S7 is less than a threshold value $P_t$ set in advance. When the change index P is less than the threshold value $P_t$ set in advance, the process proceeds to a S9. When the change index P is equal to or higher than the threshold value $P_t$ set in advance, the process ends.

In the S9, when the determination is positive in the S3, the specific proposal unit 43 proposes the automatic driving to the occupant of the mounted vehicle. When the determination is negative in the S3, the proposal unit 33 proposes the automatic driving to the occupant of the mounted vehicle. An aspect of the automatic driving proposal includes, for example, display of an image on the display device 11, output of a sound, or the like. The occupant is able to, for example, select the automatic driving in accordance with the automatic driving proposal, and shift the state of the mounted vehicle from the manual driving state to the automatic driving state.

When the determination is negative in the S1, the process proceeds to a S10. The request unit 25 determines whether the mounted vehicle has arrived at the change point. When the mounted vehicle has arrived at the change point, the process proceeds to a S12. When the mounted vehicle has not arrived at the change point, the process proceeds to a S11.

In the S11, the continuation determination unit 35 determines whether the automatic driving can be continued. The determination method is similar to that of the S2. When all of the conditions of (i) to (iv) are satisfied, the continuation determination unit 35 determines that the automatic driving can be continued. When at least one of the conditions of (i) to (iv) is not satisfied, the continuation determination unit 35 determines that automatic driving cannot be continued. When the automatic driving can be continued, the process ends. When the automatic driving cannot be continued, the process proceeds to the S12.

In the S12, the request unit 25 performs the driving change request to the occupant of the mounted vehicle. The occupant is able to, for example, shift the state of the mounted vehicle from the automatic driving state to the manual driving state in accordance with the driving change request.

In a case where the driving change request is performed, when the occupant does not shift the state of the mounted vehicle from the manual driving state to the automatic driving state, the vehicle controller 5 performs measures such as emergency stop and stops the mounted vehicle.

4. Effects Provided by Automatic Driving Proposal Portion (1A) The automatic driving proposal portion 4 proposes the automatic driving on a necessary condition that, in the S2, the automatic driving determination unit 27 determines that the automatic driving can be continued and also, in the S6, the calculation value determination unit 31 determines that the prediction time $T_e$ is higher than the threshold value $T_t$.

Therefore, even in a case where the automatic driving determination unit 27 determines that the automatic driving can be continued in the S2, when the prediction time $T_e$ is equal to or less than the threshold value $T_t$, the automatic driving proposal portion 4 does not propose the automatic driving. According to this, it may be possible to prevent a situation where the mounted vehicle immediately arrives at the change point and the driving change request is performed from occurring after the occupant selects the automatic driving in accordance with the automatic driving proposal. As the result, it may be possible to prevent the occupant from distrusting the automatic driving apparatus 3.

(1B) The automatic driving proposal portion 4 proposes the automatic driving on a necessary condition that, in the S2, the automatic driving determination unit 27 determines that the automatic driving can be continued and also, in the S8, the index determination unit 39 determines that the change index P is lower than the threshold value $P_t$.

Therefore, even in a case where the automatic driving determination unit 27 determines that the automatic driving can be continued in the S2, when the change index P is equal to or higher than the threshold value $P_t$, the automatic driving proposal portion 4 does not propose the automatic driving. According to this, it may be possible to prevent a situation where the continuation of the automatic driving is determined to be difficult and the driving change request is performed from occurring immediately after the occupant selects the automatic driving in accordance with the automatic driving proposal. As the result, it may be possible to prevent the occupant from distrusting the automatic driving apparatus 3.

(1C) The automatic driving proposal portion 4 is able to set the specific state in accordance with the operation of the occupant. When determining that the specific state has been set and also, in the S2, the automatic driving can be performed, the automatic driving proposal portion 4 proposes the automatic driving.

Therefore, when the specific state has been set in accordance with the operation of the occupant, the automatic driving proposal portion 4 is able to propose the automatic driving regardless of the value of the prediction time $T_e$ or the change index P.

Other Embodiments

While the embodiment of the present disclosure has been described, the present disclosure is not limited to the embodiment described above and can be modified in various manners.

(1) In the S6, the calculation value determination unit 31 may determine whether the distance $L_e$ is higher than the preset threshold value $L_t$. The distance $L_e$ corresponds to the calculation value. When the distance $L_e$ is higher than the threshold value $L_t$, the process may proceed to the S7. When the distance $L_e$ is equal to or less than the threshold value $L_t$, the process may end. Even in this case, the automatic driving proposal portion 4 may be possible to achieve the effects of (1A) to (10).

(2) When the determination is positive in the S6, the process may immediately proceed to the S9. That is, the processes of the S7 and the S8 may be not executed. Even in this case, the automatic driving proposal portion 4 may be possible to achieve the effects of (1A) and (10).

(3) When the determination is negative in the S3, the process may immediately proceed to the S7. That is, the processes of the S4 to the S6 may be not executed. Even in this case, the automatic driving proposal portion 4 may be possible to achieve the effects of (1B) and (10).

(4) The automatic driving proposal portion 4 may correspond to a device independent of the vehicle controller 5. Even in this case, the automatic driving proposal portion 4 may be possible to achieve the effects of (1A) to (10).

(5) Multiple functions of one configuration element in the above embodiment may be implemented by multiple configuration elements, or a single function of one configuration element may be implemented by multiple configuration elements. Further, multiple functions of multiple configuration elements may be implemented by one configuration element, or one function implemented by multiple configuration elements may be implemented by one configuration element. In addition, a part of the configuration of the described above embodiment may be omitted. At least a part of the configuration of the above embodiment may be added to or replaced with another configuration of the above embodiment.

(6) In addition to the automatic driving proposal device described above, various features such as a system having the automatic driving proposal device as a configuration element, a program for making a computer function as the automatic driving proposal device, a non-transitory tangible storage medium such as a semiconductor memory in which the program is stored, and an automatic driving method, a driving assistance method, or the like may be provided to implement the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes multiple sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An automatic driving proposal device for a vehicle configured to select either a state of an automatic driving or a state of a manual driving by an occupant, the automatic driving proposal device comprising:
   a request unit configured to perform a driving change request to the occupant when, in the state of the automatic driving, the vehicle has arrived at a change point set in advance on a route of the automatic driving;
   an automatic driving determination unit configured to determine whether the automatic driving is possible in the state of the manual driving;
   a calculation unit configured to calculate a calculation value corresponding to a distance from a current position of the vehicle to the change point or a prediction time until the vehicle arrives at the change point;
   a calculation value determination unit configured to determine whether the calculation value is higher than a threshold value set in advance;
   a specific state setting unit configured to set a specific state in accordance with an operation of the occupant;
   a specific proposal unit configured to propose the automatic driving to the occupant when the specific state has been set and when the automatic driving determination unit determines that the automatic driving is possible without (i) calculating the calculation value corresponding to the distance from the current position of the vehicle to the change point or the prediction time until the vehicle arrives at the change point and (ii) determining whether the calculation value is higher than the threshold value set in advance; and
   a proposal unit configured to propose the automatic driving to the occupant on a necessary condition that (i) the automatic driving determination unit determines that the automatic driving is possible (ii) the calculation value determination unit determines that the calculation value is higher than the threshold value, and (iii) the specific state is not set by the specific state setting unit.

2. An automatic driving proposal device for a vehicle configured to select either a state of an automatic driving or a state of a manual driving by an occupant, the automatic driving proposal device comprising:
   a continuation determination unit configured to determine whether continuation of the automatic driving is possible;
   a request unit configured to perform a driving change request when the continuation determination unit determines that the continuation of the automatic driving is not possible to change from the state of automatic driving to the state of manual driving by the occupant;
   an automatic driving determination unit configured to determine whether the automatic driving is possible in the state of the manual driving;
   an index calculation unit configured to calculate a change index that indicates a probability that the request unit can perform the driving change request and change from the state of automatic driving to the state of manual driving by the occupant within a time period before the vehicle, while in the state of the automatic driving, arrives at a point that is a predetermined distance in front of a current position of the vehicle, the index calculation unit acquiring a factor that affects the change index and calculates the change index based on the acquired factor;
   an index determination unit configured to determine whether the change index is lower than a threshold value set in advance;

a proposal unit configured to propose the automatic driving to the occupant on a necessary condition that the automatic driving determination unit determines that the automatic driving is possible and also the index determination unit determines that the change index is lower than the threshold value;

a specific state setting unit configured to set a specific state in accordance with an operation of the occupant; and a specific proposal unit configured to propose the automatic driving to the occupant when the specific state has been set and when the automatic driving determination unit determines that the automatic driving is possible without (i) calculating the change index indicating the probability that the request unit can perform the driving change request and change from the state of automatic driving to the state of manual driving by the occupant within the time period before the vehicle, while in the state of the automatic driving, arrives at the point that is the predetermined distance in front of the current position of the vehicle and (ii) determining whether the change index is lower than the threshold value set in advance.

3. An automatic driving proposal method for a vehicle configured to select either a state of an automatic driving or a state of a manual driving by an occupant, the automatic driving proposal method comprising:

performing a driving change request to the occupant when, in the state of the automatic driving, the vehicle has arrived at a change point set in advance on a route of the automatic driving;

determining whether the automatic driving is possible in the state of the manual driving;

calculating a calculation value corresponding to a distance from a current position of the vehicle to the change point or a prediction time until the vehicle arrives at the change point;

determining whether the calculation value is higher than a threshold value set in advance;

proposing the automatic driving to the occupant on a necessary condition of determining that the automatic driving is possible and also determining that the calculation value is higher than the threshold value;

setting a specific state in accordance with an operation of the occupant; and proposing the automatic driving to the occupant when having set the specific state and when also having determined that the automatic driving is possible without (i) calculating the calculation value corresponding to the distance from the current position of the vehicle to the change point or the prediction time until the vehicle arrives at the change point and (ii) determining whether the calculation value is higher than the threshold value set in advance.

4. An automatic driving proposal method for a vehicle configured to select either a state of an automatic driving or a state of a manual driving by an occupant, the automatic driving proposal method comprising:

determining whether continuation of the automatic driving is possible in the state of the automatic driving;

performing a driving change request to change from the state of the automatic driving to the state of the manual driving by the occupant when determining that the continuation of the automatic driving is not possible;

determining whether the automatic driving is possible in the state of the manual driving;

calculating a change index that indicates a probability that the driving change request and the change from the state of automatic driving to the state of manual driving by the occupant can be performed within a time period before the vehicle, while in the state of the automatic driving, arrives at a point that is a predetermined distance in front of a current position of the vehicle, wherein calculating the change index includes acquiring a factor that affects the change index and calculating the change index based on the acquired factor;

determining whether the change index is lower than a threshold value set in advance;

proposing the automatic driving to the occupant on a necessary condition of determining that the automatic driving is possible and also determining that the change index is lower than the threshold value;

setting a specific state in accordance with an operation of the occupant; and proposing the automatic driving to the occupant when having set the specific state and also having determined that the automatic driving is possible without (i) calculating the change index indicating the probability that the driving change request and the change from the state of automatic driving to the state of manual driving by the occupant can be performed within the time period before the vehicle, while in the state of automatic driving, arrives at the point that is the predetermined distance in front of the current position of the vehicle and (ii) determining whether the change index is lower than the threshold value set in advance.

5. An automatic driving proposal device for a vehicle configured to select either a state of an automatic driving or a state of a manual driving by an occupant, the automatic driving proposal device comprising:

a memory storing a program; and a microcomputer configured to read the program from the memory and execute a process, wherein the process includes a first process that performs a driving change request to the occupant when, in the state of the automatic driving, the vehicle has arrived at a change point set in advance on a route of the automatic driving;

a second process that determines whether the automatic driving is possible in the state of the manual driving;

a third process that calculates a calculation value corresponding to a distance from a current position of the vehicle to the change point or a prediction time until the vehicle arrives at the change point;

a fourth process that determines whether the calculation value is higher than a threshold value set in advance;

a fifth process that proposes the automatic driving to the occupant on a necessary condition of that the second process determines that the automatic driving is possible and also the fourth process determines that the calculation value is higher than the threshold value;

a sixth process that sets a specific state in accordance with an operation of the occupant; and a seventh process that proposes the automatic driving to the occupant when the specific state has been set and also when the second process determines that the automatic driving is possible without (i) calculating the calculation value corresponding to the distance from the current position of the vehicle to the change point or the prediction time until the vehicle arrives at the change point and (ii) determining whether the calculation value is higher than the threshold value set in advance.

6. An automatic driving proposal device for a vehicle configured to select either a state of an automatic driving or a state of a manual driving by an occupant, the automatic driving proposal device comprising:

a memory storing a program; and
a microcomputer configured to read the program from the memory and execute a process,
wherein
the process includes
a first process that determines whether continuation of the automatic driving is possible in the state of the automatic driving;
a second process that performs a driving change request to change from the state of the automatic driving to the state of the manual driving by the occupant when the first process determines that the continuation of the automatic driving is not possible;
a third process that determines whether the automatic driving is possible in the state of the manual driving;
a fourth process that calculates a change index that indicates a probability that the second process can perform the driving change request and the change from the state of automatic driving to the state of manual driving by the occupant within a time period before the vehicle, while in the state of the automatic driving, arrives at a point that is a predetermined distance in front of a current position of the vehicle, wherein the fourth process includes acquiring a factor that affects the change index and calculating the change index based on the acquired factor;
a fifth process that determines whether the change index is lower than a threshold value set in advance; and
a sixth process that proposes the automatic driving to the occupant on a necessary condition of that the third process determines that the automatic driving is possible and also the fifth process determines that the change index is lower than the threshold value;
a seventh process that sets a specific state in accordance with an operation of the occupant; and
an eighth process that proposes the automatic driving to the occupant when the specific state has been set and also when the first process determines that the automatic driving is possible without (i) calculating the change index indicating the probability that the second process can perform the driving change request and the change from the state of automatic driving to the state of manual driving by the occupant within the time period before the vehicle, while in the state of automatic driving, arrives at the point that is the predetermined distance in front of the current position of the vehicle and (ii) determining whether the change index is lower than the threshold value set in advance.

* * * * *